United States Patent [19]

Matheson et al.

[11] 4,414,973
[45] Nov. 15, 1983

[54] RESPIRATOR FACE MASK

[75] Inventors: James N. Matheson, Mission Viejo; Philip L. Lowry, Santa Ana, both of Calif.

[73] Assignee: U.S.D. Corp., Santa Ana, Calif.

[21] Appl. No.: 242,287

[22] Filed: Mar. 10, 1981

[51] Int. Cl.³ .............................................. A62B 7/00
[52] U.S. Cl. ........................... 128/206.15; 128/206.17; 128/206.24; 128/207.11; 128/207.12; 24/590; 137/854
[58] Field of Search ...................... 128/206.12, 206.15, 128/206.17, 206.24, 206.28, 207.11, 207.12, 201.25, 201.28; 137/854; 55/DIG. 33, DIG. 35; 24/222, 224, 225

[56] References Cited

U.S. PATENT DOCUMENTS

| 885,033 | 4/1908 | Forse | 24/222 R |
|---|---|---|---|
| 1,083,925 | 1/1914 | Erickson | 24/213 R |
| 1,705,447 | 3/1929 | Hagen | 24/222 R |
| 2,166,164 | 7/1939 | Lehmberg | 128/206.24 |
| 2,341,566 | 2/1944 | Monro | 128/206.24 |
| 2,744,525 | 5/1956 | Whipple | 128/206.15 |
| 2,823,671 | 2/1958 | Garelick | 128/206.24 |
| 2,858,828 | 11/1958 | Matheson | 128/207.12 |
| 2,939,458 | 6/1960 | Lundquist | 128/206.24 |
| 3,082,767 | 3/1983 | Matheson | 24/222 R |
| 3,473,561 | 10/1969 | Svenson et al. | 137/854 |
| 3,680,555 | 8/1972 | Warncke | 128/206.24 |
| 4,231,361 | 11/1980 | Wise | 128/202.26 |
| 4,304,230 | 12/1981 | Seufert | 128/206.17 |

FOREIGN PATENT DOCUMENTS

| 1174168 | 7/1964 | Fed. Rep. of Germany | 128/206.24 |
|---|---|---|---|
| 1213249 | 3/1966 | Fed. Rep. of Germany | 128/207.12 |
| 357632 | 11/1905 | France | 24/214 R |
| 102415 | 8/1963 | Norway | 128/206.17 |
| 848215 | 9/1960 | United Kingdom | 128/206.24 |

Primary Examiner—Henry J. Recla
Attorney, Agent, or Firm—George F. Bethel; Patience K. Bethel

[57] ABSTRACT

A respirator face mask formed from a silicone or other vulcanized rubber with a multi-compound curved face seal having a superior configuration for facial fit. The mask is held by four support buttons and two straps attached thereto having a reverse leverage pulldown effect to pull the mask into contact with the facial area. The four attachment means for the straps are eccentric buttons having an undercut that overrides a loop that can be easily disassociated when the attachment loop is reversed and pulled over the button. A concave configured sealing diaphragm on the exhalation valve provides for substantially uniform opening with less effort than is normally encountered in such valves. A staggered anti-inversion rib on the concave underside of the exhalation valve prevents the diaphragm from inverting to a convex configuration. The valve includes an exhalation valve stack and vent that can be covered at a sharply chamfered opening to provide for a pressure fit test. The inhalation port features two unique chamfered exterior rings which mate with a reverse chamfered cartridge. The inhalation valve is mounted on the threaded connector so as to form a slightly concave configuration to minimize the objectionable popping sound.

7 Claims, 13 Drawing Figures

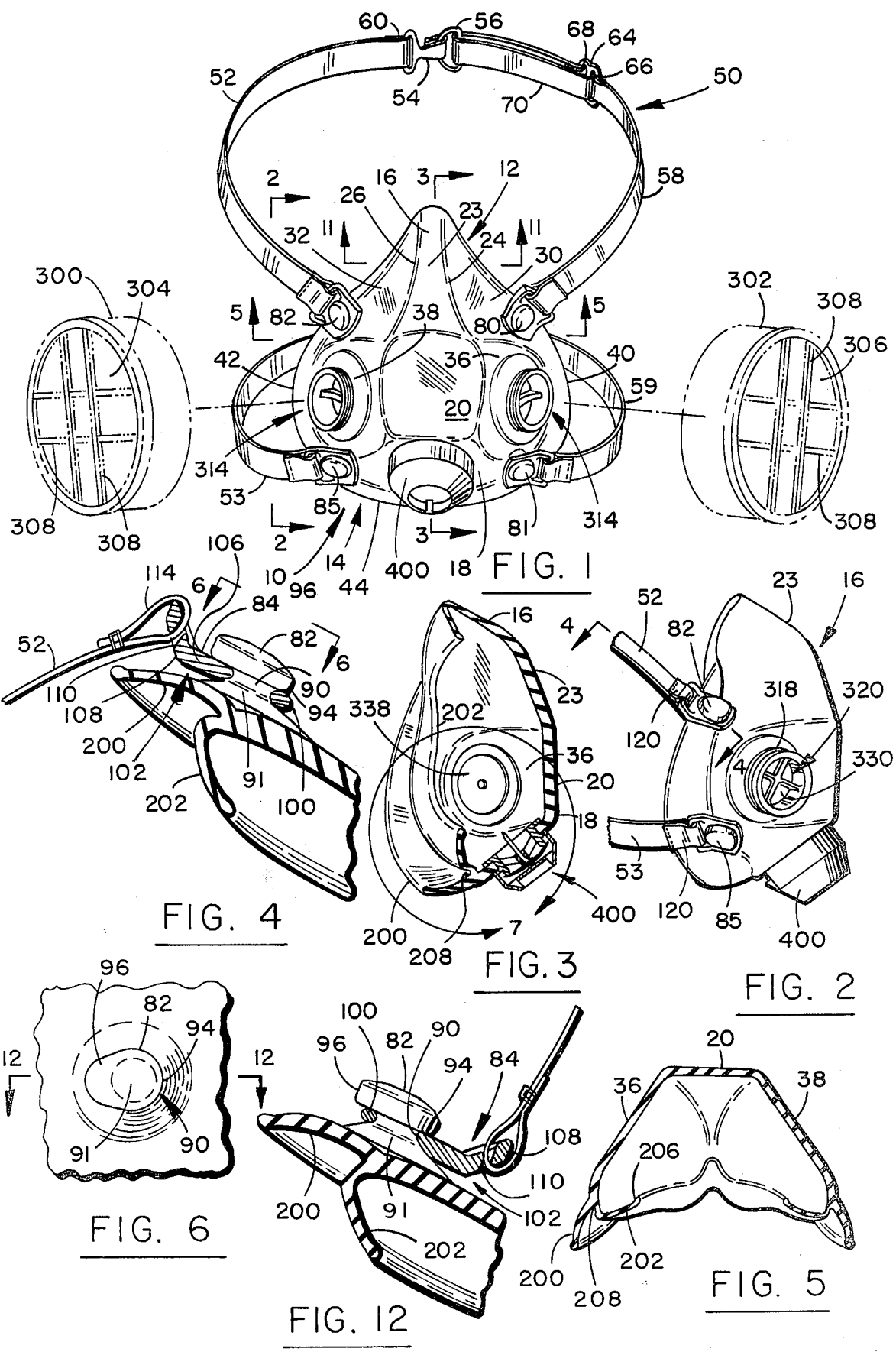

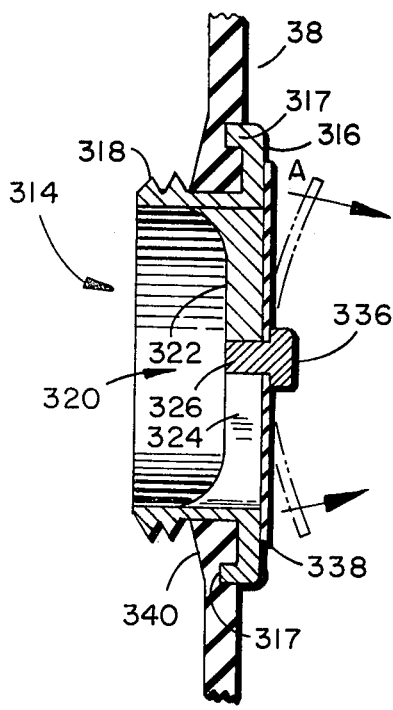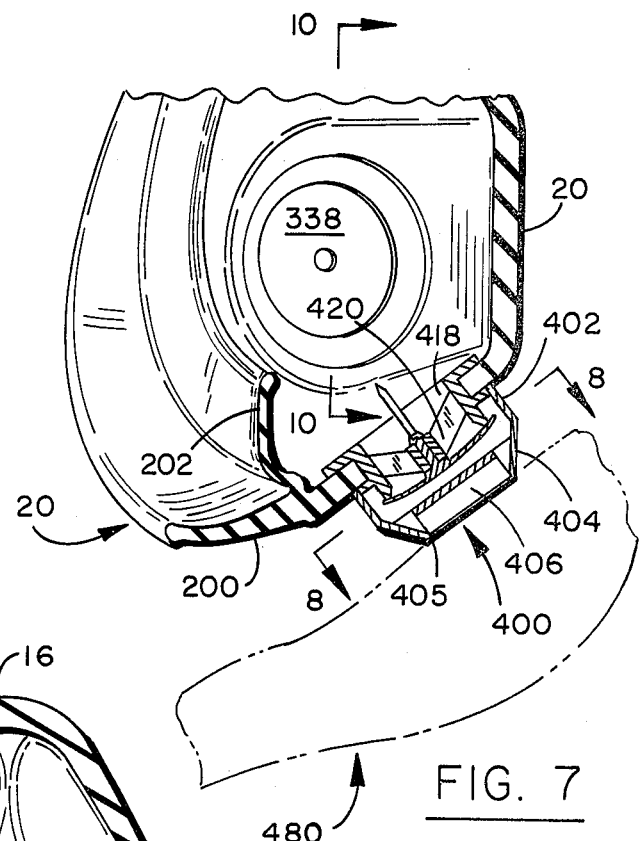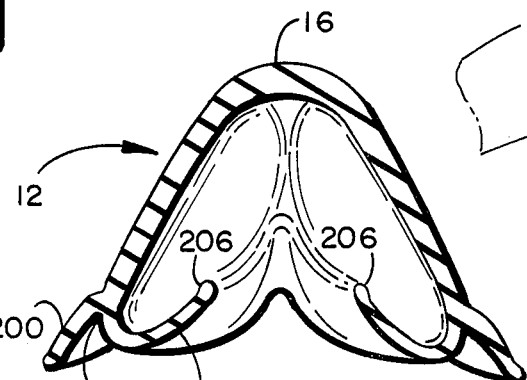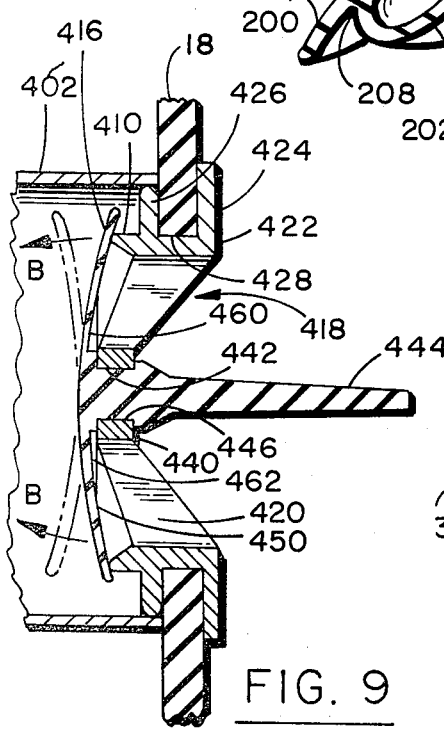

RESPIRATOR FACE MASK

BACKGROUND OF THE INVENTION

The background of this invention resides within the filtered air breathing art. In particular, the filtered air breathing art is oriented toward respirators that have cartridges for purposes of filtering such substances as dusts, fumes, mists, smokes, paint sprays, pesticides, chemical contaminants, as well as other types of noxious and deleterious gases and particulates. This invention is directed toward the foregoing field, including the face piece and the combination of the face piece and the respirator cartridge or filter it is to be used with.

THE PRIOR ART

The prior art with regard to breathing gas respirators incorporates a number of various types. These types range all the way from disposable respirators, to full face respirators having multitudinous features and means for covering the head or a substantial portion thereof.

The type of respirator to which this invention is directed, is the respirator that falls into the intermediate range between the two respective foregoing types. In particular, such respirators utilize a half-mask or full face mask that covers the nose and mouth and/or possibly the entire upper facial structure, as well as the lower facial structure. Such respirators utilize a cartridge having various filtering media therein.

In their simplest form, the cartridges incorporate a filter cloth or other media which merely filters out particulate materials or certain types of sprays and colloidal suspensions. Other types incorporate activated charcoal in combination with other elements for filtering out gases and/or vapors and treating breathing air in a positive manner to eliminate any particulate material, as well as adsorbing vapor and gas contaminants as they come in contact with the charcoal to remove entrained deleterious substances.

Finally, one of the more extensive filtration media is a filter paper for high efficiency filtration, sometimes referred to in the industry as a hepa type of filter. Such high efficiency filters incorporate pleated filter paper having minute interstices for allowing the passage of air therethrough.

This invention is directed toward the entire foregoing range of breathing gas respirators having the respective cartridges. The filter media includes a full range included within containment filter housings and cartridges.

Previously, such respirators did not provide proper fit and comfort on the face, due to their inability to conform flexurally to a number of different facial features. As can be appreciated, the various facial features of different users of respirators creates a problem wherein a substantially good fit and seal can not properly be maintained and tested.

This respirator specifically is directed toward having a flange and lip seal configuration that completely envelopes the user's nose and oral facial area. The respirator configuration relies upon an outer lip seal flange that can in some cases cover the chin, as well as the upper facial area. Also, an inner facial compound curved face seal is utilized. The inner compound surface of the face seal is curved through its cross section to provide a compound curved shape that is particularly adaptable to many facial configurations, so that it seals consistently, regardless of inhalation or exhalation. Furthermore, the compound curved seal of the outer flange or lip seal provides a certain degree of stiffening to the inner face seal. This effectuates a sealing action when exhalation, inhalation, or static conditions prevail providing a positive or negative pressure seal within the mask, to maintain a tightened fit around one's face.

Another drawback of the prior art is that the exhalation valves thereof did not easily lift from their valve surface in a uniform or even manner, generating above normal resistance to exhalation. Furthermore, due to the symmetrical ribs thereof, or other diaphragm design limitations, they oftentimes provided a very stiff valve action when the elastomeric valves were pressurized by breathing thereagainst. This is due to the fact that the ribs that were provided to prevent the exhalation valves from collapsing were bilaterally symmetrical in either one hundred and eighty degree increments, or ninety degree increments, or the diaphragm function created above normal resistance. This prevented them from effectively operating on an offset basis. This particular invention eliminates the foregoing problem by allowing easy valve operation in conjunction with staggered and offset anti-inversion ribs that prevent the collapse and inversion of the valve, while at the same time effectuating easy and facile operation thereof.

The respirator is supported on a user's head by means of a pair of elastic or rubber headband assemblies that are attached to the respirator by means of an eyelet. The band assembly provides a four point suspension at preferable places for holding the mask to provide a uniform pressure distribution at the exterior surface thereof. The eyelets are particularly structured to cooperate with attachment buttons for reverse leverage, so that the strap pulls the mask into the facial configuration of the user. In this manner, the eyelet compared to the prior art, provides a substantially greater degree of fit and comfort. This is particularly true in consideration of the seal and the configuration thereof.

The cooperative means for holding the eyelet comprises a button or bollard type of configuration formed as an offset or eccentric type of button. The eccentric offset allows for superior holding of the eyelet. This is due to the fact that the eyelet is secured firmly in the direction of use. When the band with the eyelet is to be removed, it can be turned one hundred and eighty degrees for easy snap-over removal from the lesser portion of the non-eccentric side of the button.

In prior art respirators where the bands had to be washed and cleaned periodically, it was very difficult to remove the bands on an easy basis, thereby making it difficult to clean and service the respirator. This invention with the reverse leverage eyelet, as well as the offset eccentric button with the undercut, provides for easy and facile removal of the band, as well as maintenance of improved fit and seal.

The respirator incorporates an exhalation valve guard having a chamfered or reduced edge surface around the exterior thereof for easy sealing by means of one's hand or thumb. The valve guard attachment to the rubber face mask provides an airtight peripheral seal to allow for a positive pressure qualitative facial fit test. This is accomplished by merely placing one's hand over the exhalation valve guard and trapping the air within the mask. Thereafter, a user can exhale lightly to assure that there is a tight seal and fit by the absence of air leakage around the facial contact periphery. Accordingly, a superior fit and test can be maintained by the exhalation valve guard.

In addition to the foregoing features, the inhalation valve of this invention is recessed slightly in its center toward the inhalation ports. This allows for more facile displacement of the valve from the seating surface. The net effect provides for easier breathing and serves to eliminate the popping sound attendant with most inhalation valves of the prior art.

The foregoing features fundamentally provide for a superior respirator face piece in form, fit and function. Accordingly, it should be readily understood hereinafter when viewed in light of the prior art, that this is a step over the prior art and an improvement for such respirators.

SUMMARY OF THE INVENTION

In summation, this invention comprises a respirator facepiece having a form fitting compound surface facial seal with a unique and superior interlocking threaded connector with a highly efficient exhalation valve with offset staggered anti-inversion ribs with a valve guard providing pressure testing, and a suspension means incorporating a unique eyelet and button configuration for firm attachment and uniqure facial pressure distribution capability.

More specifically, the invention incorporates a mask having a compound curved face seal. The face seal has an outer flange to form a lip seal and an inner face seal formed as a compound curve that seals snugly against the user's face. The conformation of the outer lip seal and inner face seal provides a sufficiently stiff sealing effect to the mask while at the same time incorporating a substantially improved comfort fit as well as positive and negative pressure seal.

The mask is held in place by means of a suspension means incorporating four suspension points having a unique eccentric button with an undercut formed in an eccentric manner. The button serves to hold an eyelet to which the suspension straps are attached.

The eyelet provides a reverse leverage securement means to the strap so that as the strap pulls downwardly, it pulls the eccentric button and the mask attached thereto into tight fitting relationship to further enhance the sealing thereof. The button with its eccentric configuration allows for a rotation of the eyelet to the lesser of the underlying portion thereof for removal of the eyelet. This allows for easy removal while at the same time secure placement of the mask on a user's face.

The mask incorporates an exhalation valve having a chamfered guard structure in conjunction with a peripheral airtight seal to the facepiece. The chamfered guard structure allows for placement of one's hand or other object over the valve structure to permit positive pressure within the mask for testing the face fit seal.

The exhalation valve member incorporates a staggered anti-inversion ribbed exhalation valve flapper. The elastomeric flapper is provided with the anti-inversion ribs in a staggered relationship to allow for ease and facility of the operation of the valve flapper on a more uniform basis.

The inhalation valve is recessed in a concave manner to facilitate its operation in a smoother manner. The concave conformation not only affords easy lifting of the valve, but avoids the noxious popping attendant with the prior art.

Thus, the invention incorporates a unique respirator face piece, threaded connector, exhalation valve, exhalation valve guard and suspension means to enhance the entire operation over the prior art, when combined with a suitable cartridge and/or filter.

BRIEF DESCRIPTION OF THE DRAWINGS

The invention will be more clearly understood by reference to the description below taken in conjunction with the accompanying drawings wherein:

FIG. 1 shows a frontal elevation view of the respirator face piece of this invention with the cartridges that attach to the connector portion in a removed configuration therefrom;

FIG. 2 shows a side elevation view of the respirator in the direction of lines 2—2 of FIG. 1;

FIG. 3 shows a sectioned view in the form of a midline sectional view as seen in the direction of lines 3—3 of FIG. 1;

FIG. 4 shows a fragmented sectional view of the connection means of this invention as sectioned along lines 4—4 of FIG. 2;

FIG. 5 shows a sectioned view of the respirator as sectioned in the direction of lines 5—5 upwardly and through the mask as seen in FIG. 1;

FIG. 6 shows a plan view of the securement button showing the eccentric offset relationship thereof when looking downwardly in the direction of lines 6—6 of FIG. 4;

FIG. 7 shows a detailed view as sectioned through and surrounded by circle 7 of FIG. 3, wherein one's hand is overriding the exhalation valve cover thereof for purposes of a pressure test;

FIG. 8 shows a plan view of the offset staggered ribs of the exhalation valve flapper as seen in the direction of lines 8—8 of FIG. 7;

FIG. 9 shows a sectional view of the exhalation valve in its operative mode as sectioned in the direction of lines 9—9 of FIG. 8;

FIG. 10 shows a sectional view of the inhalation valve as seen in the direction of lines 10—10 of FIG. 7;

FIG. 11 shows a sectional view of the upper nasal portion of the respirator mask as seen in the direction of lines 11—11 of FIG. 1;

FIG. 12 shows a sectional view of the button and attachment eyelet as seen in the direction of lines 12—12 of FIG. 6; and, FIG. 13 shows an alternative embodiment of the inhalation valve with its concave and recessed conformation, which has been derived from the same orientation as FIG. 10.

THE PREFERRED EMBODIMENTS

Looking more particularly at FIG. 1, a mask 10 is shown that has been formed of silicone or other vulcanized rubber. The silicone rubber is formed to conform to a user's face. The face piece incorporates generally a nasal area 12 and an oral area 14. These two respective areas comprise a narrow portion 16 in the nasal area which generally conforms to a person's nose and a lower enlarged portion with a flattened portion 20 in proximate relationship to a user's mouth. The nasal area 12 seals around the nose with a very narrow indented portion having rounded indentations 24 and 26 on either side thereof. This allows for a smooth concavity 30 and 32 sloping downwardly from the nasal bridge portion 23.

On either side of the oral nasal portion are two relatively flattened portions 36 and 38. The relatively flattened portions 36 and 38 have a filtering cartridge connector that will be described hereinafter in greater detail.

The overall facial contour expands outwardly so that the edge portions in the form of a rounded edge portion 40 and 42 allow for an enclosure around one's face going downwardly toward the chin section or lower portion 44 of the oral portion of the mask.

The mask is held at each side portion at the top and the bottom by means of two straps. In particular, an upper strap 50 which can be made of either an elastomer in the form of a rubber band assembly or an elastic material in the form of a textile material is utilized. The upper strap assembly or band assembly has a first portion 52 having a combination hook and eyelet 54 that is received by a loop 56 of a second strap 58. The hook and eyelet 54 can be of any configuration sufficient to allow an attachment and detachment of the strap 50 from around the back of a user's head.

The hook and eyelet is secured by means of an overturned stitched portion 60 or bar tack, and secured to the first portion 52. The second portion 58 has a double belt loop adjustment means 64 with two openings 66 and 68 through which the second portion 58 is looped. This provides for adjustment by frictionally engaging the strap 58 passing through the respective loops 66 and 68. Thus, the double portion 70 can be adjusted to provide for various sizes of the entire strap 50 for various head sizes.

A novel feature of this invention is the means of attaching the straps or band assemblies 50 to the mask. This is performed by way of two buttons 80 and 82 that are eccentric in their relationship. They are cast or molded with the mask in the form of a silicone rubber in situ. This attachment means is directly analogous to the means for attaching the lower strap 53.

The buttons 80 and 82, as can be seen in FIGS. 2, 4, 6 and 12 when derived from FIG. 1, appear to be a bollard type of configuration with an eccentric plan view. The derived showings of the details thereof will show button 82.

The button 82 receives an eyelet 84 that has an upward angular configuration. The eyelet 84 has an opening 86 through which the button 82 passes. In like manner, the button 80 has a similar eyelet 84 attached thereto which serves the same function.

The button 82 head has an undercut portion 90 that specifically overlies the eyelet 84 so that the button actually forms a mushroom configuration thereover. The button 82 with its mushroom configuration and the undercut portion 90 allows for rotational movement of the eyelet 84 underneath the button 82.

A narrower undercut portion 94 on the button 82 head is complemented by a wider portion 96. This wider portion 96 in conjunction with the narrower portion 94, allows for a tightened holding of the eyelet 84 and a removal with rotation thereof one hundred and eighty degrees, as shown in FIG. 12. However, the eyelet 84 can also be forced over the button in the position shown in FIG. 4.

The button 82 is formed in a generally eccentric cam shaped form which allows for an overlayment of the larger or eccentric portion 96 over the eyelet. Furthermore, the groove provided by the undercut 90 which is generally circumferential in nature, allows for a pivotal movement of the eyelet 84 with its opening therearound completely around the base, groove or undercut 90 of the button 82. As a consequence, when the strap 50 pulls thereagainst, it can be oriented in a swinging movement around a post 91 in a circumferential manner in whatever direction it is being pulled. This allows for a floating of the eyelet 84 into whatever position it finds itself with regard to the post 91.

The eyelet 84 is formed with its opening 86 which surrounds the post 91 in the form of a round circular portion 100 and an elongated portion 102 that is formed with a relatively coplanar portion 106 coplanar with the circular portion 100 having opening 86. Extending from the coplanar portion 106 is an upwardly extending angular member 108 having a slot 110 therein. The slot 110 with the upper angular portion 108 allows for the strap 50 with its two portions 52 and 58, to exert pressure in toward the mask 10 when they are looped and secured on their respective posts 91. This inward leverage effect creates a situation whereby an inward driving force pushes the post 91 and the underlayment to which the mask forms a portion thereof into the user's face for a tightly juxtaposed fit to a user's face.

Accordingly, the eyelet 84 is pulled inwardly by the action of the strap pulling against the angular portion 108 so as to squeeze the mask against a person's face.

This is very important in the overall concept of allowing for a superior fit. The loop 114 of the straps 52 and 58 can be formed with the eyelet 84 or stitched or bar tacked, as can be seen in the showing of FIG. 4.

The buttons 80 and 82 are similarly reproduced in the form of buttons 81 and 85 at the base of the mask in the general area of the oral cavity portion 14. The buttons 81 and 85 are connected by means of a band or strap assembly comprising two portions 53 and 59 that circumscribe the user's head in the same manner as the strap 50. Thus, the straps 53 and 59 in their configuration are secured and formed in the exact manner as the strap 50 and perform in the same manner.

Both of the upper and lower straps are removable by rotating the eyelet 84 as seen in FIG. 12 one hundred and eighty degrees and lifting upwardly over the narrowed undercut portion 94 on the post 91. This effectively allows for easy removal over the narrower portion of the eyelet 84 while the smaller portion 100 is allowed to slide back under the undercut 96 after it is pivoted upwardly. Thus, the eyelet 84 is easily removed from the mask to effectuate a cleaning of the upper and lower straps without a cleaning of the entire mask. Inasmuch as oftentimes the straps are made of an elastomeric textile material, perspiration, dirt and other elements gather thereon and they must be attendantly washed. Thus, the strap removal and ease of using the strap is enhanced by this invention significantly.

As can be seen from the foregoing, the button and eyelet configuration, respectively the buttons 80 or 82 and the eyelet 84 allow for the reverse leverage pulling fit of the mask on a user's head, while at the same time providing for various facial configurations, due to the eyelet 84 being allowed to pivot around the post 91. Furthermore, the eyelet 84 can be easily removed by turning it one hundred and eighty degrees and moving it over the narrow portion 94 of the post 90. All the foregoing features substantially enhance the ability of the mask to function and be cleaned and used on a day to day basis.

The mask is configured with a seal in the form of an outer seal 200 that circumscribes a user's face or in some cases passes around a portion thereof. An inner seal 202 is shown having a compound curved cross sectional portion at each portion where it contacts the face. The respective portions of the seal 200 and 202 are shown in the cross sectioned configurations respectively in FIGS. 3, 4, 5, 7, 11 and 12. This showing of the different cross sectional areas shows a compound curved surface on the inner seal portion 202 terminating at an edge portion 206 all the way around a user's face. This provides a significant seal by the compound curved portion 202 pushing against the user's face.

The outer seal 200 is connected to the inner compound curved portion of the seal 202 at an apex or inset portion 208 that allows for a flexing of the two respective seals 200 and 202 so that a double seal and tight configuration can take place.

The outer seal 200 generally extends backwardly from the mask as a continuity of the side portions, such as side portions 36 and 38. It also allows for a stiffening of the entire seal area, so that the two respective seals 200 and 202 seek their own seating across the inset portion 208. This allows for a bridged seal configuration.

Looking more specifically at FIG. 1 in relationship to the cartridges that are attached to the mask, it can be seen that two cartridges 300 and 302 have been shown. The two respective cartridges have a gridwork across their front in the form of gridwork 304 and 306 that have reinforcing cross-ribs 308. The reinforcing cross-ribs and the gridwork 306 allow for the passage of air through the cartridges into the respirator cavity defined by the oral-nasal interior cavity. This particular passage of air can be in the form of filtered air that has been filtered either for avoidance of chemical contaminants, smoke, colloidal suspensions, or particulate material.

Many cartridges are known in the art that incorporate filter media, such as charcoal, activated charcoal, cotton batting, textile materials, and treated fabrics and other materials having interstices. Other particular types of filtering media include what is known as a high efficiency filtration type filter (hepa) which is made of porous paper. The porous paper is particularly treated to allow for passage of gas therethrough, while at the same time permitting appropriate filtration of any particulate contaminants in the air that is being breathed, including radionuclides and bacteria.

All of the foregoing filters are generally known in the art as to the interior filtering media and have various characteristics that are required for various types of filtering.

In order to attach the filter to the respirator, a connector coupling 314 is shown attached to either side. The connector coupling 314 as seen in the detailed showings of FIGS. 2 and 10, incorporates an inner plastic lip 316 and a threaded portion 318 formed as a circumferential connector for passing through the side walls 36 or 38 of the respirator. The plastic lip 316 has a flange 317 therearound which seats into the silicone rubber to form a tightened fit and improved seal.

The connector coupling 314 is made of a plastic and is bridged by a cross member 320 having cross members 322 and 324 spanning in one direction and cross member 326 so that the foregoing create a series of quadrants such as quadrants 330 through which air can pass.

The cross members 322 and 324 and the central cross portion 326 are formed with an enlarged button 336 which serves to secure a round elastomeric flap 338 or breathing inhalation valve. The inhalation valve 338 moves in the direction of arrow A into the dotted configuration as shown in FIG. 10 when inhalation takes place due to a negative pressure, pulling the inhalation valve 338 internally. The button 336 or protuberance of the cross member 326 is sufficiently large to allow the elastomeric valve 338 to be implaced thereover when inserted but not removed upon breathing, which creates a negative pressure in the direction of Arrow A. Thus, air enters from the left to the right of the inhalation valve shown in FIG. 10, and attendantly through the cartridges 300 or 302 when threaded to the threads 318 of the connector.

The connector coupling 314 can be inserted into an enlarged cross section 340 formed as a portion of the side wall 38 or a second mating ring member can be threaded downwardly onto the connector or fixed in place by means of being frictionally engaged.

The foregoing configuration allows breathing action to take place while appropriately causing the valve 338 to be displaced from the surface during inhalation. When exhalation takes place, the valve 338 is driven in the opposite direction of Arrow A into its seated position as shown in the figures and stops any air from passing outwardly through the valve 338 and through the connected cartridge. The seating of valve 338 during exhalation is aided by support from cross ribs 320, 322 and 324.

Looking more particularly at FIG. 13, an alternative and improved configuration for the inhalation valve has been shown. In effect, the valve 338 is oriented in a concave manner so as to move more readily from its seating surface. This avoids the popping associated with prior art valves.

The structure incorporates the mask side wall 38 having an expanded portion analogous to portion 340 of FIG. 10. This expanded portion is chamfered to receive a reverse chamfer of the cartridge leading edge as it is turned over threads 318, thereby securing the side wall 38.

After it is seated on threads 318 it serves to seal the wall 38 against the extended circumferential ledge 321 and against the surrounding ring member 319.

Ring member 319 is L-shaped in cross section with one portion receiving the expanded angular edge of side wall 38, and the other portion providing a seat against which valve 338 can rest. Ring member 319 can be sonically welded or adhesively secured to flange 321.

The valve member 338 is concave in its normal resting and sealing mode due to the space provided by the interior edge 323 of the ring 319. Furthermore, the interior space 325 between the button 336 and the rib surfaces 324 and 322 is below the planar edge of the outside surface of ring 319. This effectuates pulling the valve 338 into a concave mode. The attendant result is improved lifting of the valve from the surface of ring 319 and substantial elimination of the popping sound.

The entire respirator when it is implaced, provides for exhalation through an exhalation valve assembly 400 that is seen in the various figures in its sealed condition. The exhaust or exhalation valve 400 has a valve guard 402 that extends outwardly into a chamfered frusto conical configuration having tapered edges 404 that surround an exhaust opening 406.

The valve guard 402 is held to an exhalation valve seat 410 that is in the form of a fixture seated in the lower or oral portion of the respirator 18. The exhalation valve seat 410 comprises a narrow circumferential chamfered portion or seat proper 416 that circumscribes an opening 418. The opening 418 has a plurality of ribs 420 that serve to span the circumferential portion 422 of the exhalation valve seat. The circumferential portion 422 has circumferential flanged walls 424 and 426 that define a channel 428 into which the oral portion 18 of the respirator wall is seated.

The ribs 420 terminate in a central rounded ring member 440 that forms an opening 442. The opening 442 receives a singular molded central shaft or stem portion 444 having a slight undercut 446. The undercut 446 allows the shaft portion 444 to be seated into the ring member 440. This in turn secures a flat valve member in the way of exhaust valve 450. The exhaust valve 450 is molded in one piece with the stem 444. It is seated in place by pushing it through the opening 442 until the undercut 446 rides over the surface of the circumferential portion 440. The flap of the valve 450 is molded with a conical configuration, with the interior concavity seating against the edge 416 of the valve seat 410.

In the foregoing manner, the flap of the valve 450 is allowed to seat in its mushroom configuration against the chamfered edges 416 of the valve seat. The valve operates upon exhaust or exhalation in the direction of Arrows B when positive pressure is received through the opening 418. When inhalation takes place through the cartridges 300, thereby negative pressurizing the mask 10, the valve 450 seats against the edges 416 tightly.

The exhaust valve 450 can be seen in a plan view configuration in FIG. 8. In this view, it is noted that it is a circumferential disc with two anti-inversion ribs 460 and 462 that are offset from the central portion or stem 444. This offset from the central portion or stem 444 is particularly unique to the valve 450.

In the prior art, the ribs 460 and 462 were generally one hundred and eighty degrees apart and diametrically opposite in the form of one complete cross rib. This invention is particularly designed to prevent inversion of the valve inwardly in the opposite direction of Arrow B. If the valve 450 is inverted inwardly, of course, it will allow intake gases to enter and thereby create a situation wherein the outside air is breathed, rather than coming through the cartridges 300.

Thus, the anti-inversion ribs prevent inversion of the valve, or movement opposite from Arrow B and are quite important. However, when placed opposite each other or in quadrants, they provide either too much resistance or stiffness during operation or did not unseat from the valve seat 416 in a uniform manner as far as displacement all the way around the edge of the valve seat 416.

By means of the staggered anti-inversion ribs 460 and 462 that have been staggered from the midline defined by guidelines 470, the valve 450 tends to flex in a more uniform manner. This also allows a more facile displacement thereof upon breathing, so that it unseats properly upon positive pressure in the direction of Arrow B away from the valve seat 416. This is a substantially important feature in light of the fact that the valve 450 must be displaced periodically in a uniform manner yet at the same time, cannot be allowed to invert inwardly opposite from the direction of Arrow B.

Another unique feature of this invention is the chamfered exhalation valve guard surface 404 that terminates in the circumferential edge region 405 around the edge of the exhalation valve guard. This is particularly helpful when a positive pressure for qualitative test purposes is to be maintained within the respirator.

When the respirator is in place, it is sometimes beneficial to test whether a good facial seal has been achieved by means of positive pressure. However, this invention overcomes that difficulty by allowing one's hand generally shown as a hand 480 to be placed across the surface of the reduced edge 405 to provide a seal to the opening 418.

In this manner, one can back pressure exhalation exhaust air normally passing through the exhalation valve guard by placing the hand 480 thereover and breathing downwardly. This serves to test whether or not there is a full seal provided by the seals 200 and 202. The lack of a seal is easily determined by absence of outward air leakage around the facial contact periphery. Thus, the seal can be tested by the placement of a user's hand over the extended exhalation valve guard surface 405. This allows for a safe utilization of the respirator and a facile test thereof by blowing downwardly against the exhalation valve guard with the hand 480 blocking the outlet 418.

Accordingly, it can be seen that this invention is a substantial step over the prior art with the various features that have been enunciated hereinbefore. As a consequence, the invention should be read broadly in consideration of prior art, particularly when considering all the various features as hereinbefore stated and which shall be set forth in the claims hereinafter.

We claim:

1. An improved respirator having a facial configuration for covering the oral and nasal areas of a user's face where the improvement comprises:
   a respirator mask having a peripheral edge adapted to lie about the oral nasal area of a user's face and an oral and nasal cavity;
   passage means for attaching at least one air filtration cartridge to said respirator mask;
   inhalation valve means in said passage which upon exhalation will close off the cartridge passage means;
   an outlet in said mask having an exhalation valve for exhausting air from a user's lungs;
   sealing means extending around the peripheral edge of said mask for sealing the oral nasal cavity when positive or negative pressure is applied internally thereto when the respirator is on one's face; and,
   support means for holding said respirator on a user's face formed with a resilient post attached to said respirator mask having a resilient enlarged head, and an eyelet having an opening which fits snugly about said post removably mounted over said head with a strap attached to said eyelet for attachment to a second resilient post having a resilient enlarged head attached to said respirator mask with an eyelet having an opening which fits snugly about said second post at the other end of said strap removably mounted on said second post, and wherein said heads have an eccentrically shaped portion for overlying a portion of said eyelet and an undercut thereto providing pivotal movement of said eyelet beneath said undercut around said post for various pivotal orientations of the strap.

2. The improvement as claimed in claim 1 further comprising:
   said outlet having an exhaust exhalation valve seat;
   an exhaust exhalation valve formed as an elastomeric member for seating over said valve seat; and,
   said exhalation valve having anti-inversion ribs which are offset with respect to the center thereof and molded within the rubber elastomeric portion of said exhalation valve.

3. An improved respirator as claimed in claim 1 further comprising:

each of said eyelets having an upstanding angular member extending from said post of which the terminal end receives said strap to provide leverage downwardly against the area adjacent to said post and upward movement to the portion of said post remote therefrom.

4. An improved facemask made of elastomeric material having a wall with a peripheral seal having an exterior surface and an interior surface comprising:

an opening in said facemask wall;

a filter cartridge having a cylindrical outlet fitting defining an outlet port, said outlet fitting having an inwardly directed chamferred surface at the outlet port thereof;

an inlet fitting extending through said facemask wall opening formed as a cylindrical member having an outwardly extending flange on one end adapted to be secured against the interior surface of the facemask, said filter cartridge outlet fitting being mounted on said inlet fitting at the other end thereof;

said facemask wall having an enlarged cross sectional portion surrounding said opening, said enlarged cross sectional portion on the exterior side of said facemask sloping away from around said inlet fitting; and, a wall formed on the peripheral edge of said flange on said inlet fitting extending toward said interior surface forming a channel for receiving said enlarged portion of said facemask wall, means associated with said inlet and outlet fittings for forcibly securing said outlet fitting on said inlet fitting such that said enlarged cross sectional portion is wedged between said channel and said chamferred surface.

5. The improved facemask as claimed in claim 4 wherein:

said wall of said fitting opposite said means adapted to receive said filter cartridge is formed by a flange formed on said fitting turned inwardly toward the wall of said facemask to receive the enlarged portion therein by compression between said cartridge and wall.

6. The improved facemask as claimed in claim 5 wherein:

said enlarged portion is formed on the outside of said facemask wall.

7. The improved facemask as claimed in claim 5 wherein:

the enlarged portion is formed on the inner side of said facemask wall.

* * * * *